US012803304B2

(12) United States Patent
Son et al.

(10) Patent No.: US 12,803,304 B2
(45) Date of Patent: Nov. 17, 2026

(54) ELECTRONIC DEVICE INCLUDING INTERLOCK CIRCUIT

(71) Applicants: HYUNDAI MOTOR COMPANY, Seoul (KR); KIA CORPORATION, Seoul (KR)

(72) Inventors: Ji Wan Son, Yongin-si (KR); Taewoong Lim, Hwaseong-si (KR); Chan Woong Jo, Yongin-si (KR); Dong Seok Oh, Hwaseong-si (KR); Chang Hwan Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 854 days.

(21) Appl. No.: 18/142,680

(22) Filed: May 3, 2023

(65) Prior Publication Data

US 2024/0072553 A1 Feb. 29, 2024

(30) Foreign Application Priority Data

Aug. 25, 2022 (KR) ........................ 10-2022-0106534

(51) Int. Cl.

*H01M 10/44* (2006.01)
*B60L 3/00* (2019.01)
*H01M 10/46* (2006.01)
*H02J 7/40* (2026.01)
*H02J 7/60* (2026.01)

(52) U.S. Cl.

CPC ............ *H02J 7/685* (2026.01); *B60L 3/0046* (2013.01); *H02J 7/40* (2026.01)

(58) Field of Classification Search

CPC .. H02J 7/685; H02J 7/855; H02J 7/663; H02J 7/40; B60L 53/16; B60L 3/0046; B60L 3/04

USPC ......................... 320/104, 107, 127, 135, 136

See application file for complete search history.

(56) References Cited

U.S. PATENT DOCUMENTS

2018/0373301 A1* 12/2018 Huang ...................... G06F 1/30
2020/0004308 A1* 1/2020 Moritomo ................. G06F 1/28

FOREIGN PATENT DOCUMENTS

CN 102640387 A * 8/2012 .......... H01M 10/465
WO WO-2016123305 A1 * 8/2016 ............... H04B 3/54

* cited by examiner

*Primary Examiner* — Edward Tso
(74) *Attorney, Agent, or Firm* — MCDONNELL BOEHNEN HULBERT & BERGHOFF LLP

(57) ABSTRACT

An electronic device includes a connector including a pair of terminals connected to a power source, a voltage sensor provided to detect a voltage between the pair of terminals, a communication device provided to perform communication with an external control device through a network, and a controller configured to determine whether the connector is separated from the power source based on a voltage variation between the pair of terminals, control the communication device to request the external control device to cut off power of the power source when the connector is separated from the power source, and control to perform self-discharge.

20 Claims, 11 Drawing Sheets

FIG. 4

| OPERATING INTENSITY (OPERATING RPM) | VOLTAGE VARIATION ABSOLUTE VALUE CRITERION (PRESET VALUE) | DETERMINATION AS SEPARATION OF CONNECTOR |
|---|---|---|
| 1,000 | 600V | VOLTAGE VARIATION CRITERION OR MORE |
| MEDIAN VALUE | Ax+b (LINEAR FUNCTION) | |
| 10,000 | 200V | |

FIG. 7

| NUMBER OF TIMES OF INTERLOCK CIRCUIT OPEN DETECTION | OPERATION CONTENT |
|---|---|
| FIRST NUMBER OF TIMES | DETERMINATION OF WHETHER CONNECTOR IS SEPARATED BASED ON VOLTAGE VARIATION BETWEEN TERMINALS TO WHICH POWER SOURCE IS APPLIED |
| SECOND NUMBER OF TIMES (EXCEEDING FIRST NUMBER OF TIMES) | DETERMINATION AS CONNECTOR BEING SEPARATED |

ELECTRONIC DEVICE INCLUDING INTERLOCK CIRCUIT

CROSS REFERENCE TO RELATED APPLICATIONS

This application is based on and claims priority under 35 U.S.C. § 119 to Korean Patent Application No. 10-2022-0106534, filed on Aug. 25, 2022, in the Korean Intellectual Property Office, the disclosure of which is incorporated by reference herein in its entirety.

BACKGROUND

1. Field

The disclosure relates to an electronic device driven by a high voltage and a control method thereof.

2. Description of the Related Art

In the case of a high voltage component used in an eco-friendly vehicle such as an electric vehicle, an interlock function capable of cutting off the power of a battery and discharging the high voltage component when a connector connected to the battery is separated for safety needs to be necessarily applied.

In general, a high voltage component has a high voltage of 60V or more (e.g., 200V to 800V) as a rated use voltage, and because in a case where the high voltage component comes into contact with a person when a connector connected to a battery is separated, the person may be harmed due to a charging current remaining in the high voltage component, the interlock function is compulsory by law.

Recently, it is common that an interlock circuit is provided to pass through an upper-level control device, a connector of a high voltage component, and a power-side connector so that the upper control device identifies separation of the connector depending on whether the interlock circuit is open (disconnected).

SUMMARY

It is an aspect of the disclosure to provide an electronic device capable of increasing the accuracy of detecting separation of a connector while optimizing a circuit architecture by determining whether the connector is separated from a power source based on a voltage variation between connector terminals even if an interlock circuit is minimized or removed, and a control method thereof.

Additional aspects of the disclosure will be set forth in part in the description which follows and, in part, will be obvious from the description, or may be learned by practice of the disclosure.

In accordance with an aspect of the disclosure, an electronic device includes a connector including a pair of terminals connected to a power source, a voltage sensor provided to detect a voltage between the pair of terminals, a communication device provided to perform communication with an external control device through a network, and a controller configured to determine whether the connector is separated from the power source based on a voltage variation between the pair of terminals, control the communication device to request the external control device to cut off power of the power source when the connector is separated from the power source, and control to perform self-discharge.

The controller may determine that the connector is separated from the power source when a change value of the voltage between the pair of terminals for a preset time in an operation mode of the electronic device is equal to or greater than a preset value.

The controller may adjust such that the preset value decreases as an operating intensity of the electronic device increases.

The controller may determine that the connector is separated from the power source when a change rate of the voltage between the pair of terminals per unit time in a standby mode of the electronic device is maintained within a preset range.

The controller may determine whether the change rate of the voltage between the pair of terminals per unit time is maintained within the preset range by determining the change rate of the voltage between the pair of terminals per unit time by a set number of times at a preset time interval.

The electronic device may further include an interlock circuit provided to form a closed circuit by being connected to an interlock circuit of the power source when the connector is connected to the power source and form an open circuit when the connector is separated from power source.

The controller may determine at a preset time interval whether the interlock circuit is open.

The controller may determine whether the connector is separated from the power source based on the opening of the interlock circuit and the voltage variation between the pair of terminals when identifying that the interlock circuit is open at a preset first number of times.

The controller may determine that the connector is separated from the power source when identifying that the interlock circuit is open at a preset second number of times.

The preset second number of times may be greater than the preset first number of times.

In accordance with an aspect of the disclosure, a control method of an electronic device, which includes a connector including a pair of terminals connected to a power source, a voltage sensor provided to detect a voltage between the pair of terminals, and a communication device provided to perform communication with an external control device through a network, includes determining whether the connector is separated from the power source based on a voltage variation between the pair of terminals, controlling the communication device to request the external control device to cut off power of the power source when the connector is separated from the power source, and controlling to perform self-discharge.

The determining of whether the connector is separated from the power source based on the voltage variation between the pair of terminals may include determining that the connector is separated from the power source when a change value of the voltage between the pair of terminals for a preset time in an operation mode of the electronic device is equal to or greater than a preset value.

The determining of whether the connector is separated from the power source based on the voltage variation between the pair of terminals may include adjusting such that the preset value decreases as an operating intensity of the electronic device increases.

The determining of whether the connector is separated from the power source based on the voltage variation between the pair of terminals may include determining that the connector is separated from the power source when a change rate of the voltage between the pair of terminals per unit time in a standby mode of the electronic device is maintained within a preset range.

The determining of whether the connector is separated from the power source based on the voltage variation between the pair of terminals may include determining whether the change rate of the voltage between the pair of terminals per unit time is maintained within the preset range by determining the change rate of the voltage between the pair of terminals per unit time by a set number of times at a preset time interval.

The electronic device may further include an interlock circuit provided to form a closed circuit by being connected to an interlock circuit of the power source when the connector is connected to the power source and form an open circuit when the connector is separated from power source.

The control method may further include determining at a preset time interval whether the interlock circuit is open.

The determining of whether the connector is separated from the power source based on the voltage variation between the pair of terminals may include determining whether the connector is separated from the power source based on the opening of the interlock circuit and the voltage variation between the pair of terminals when identifying that the interlock circuit is open at a preset first number of times.

The control method may further include determining that the connector is separated from the power source when identifying that the interlock circuit is open at a preset second number of times.

The preset second number of times may be greater than the preset first number of times.

BRIEF DESCRIPTION OF THE FIGURES

These and/or other aspects of the disclosure will become apparent and more readily appreciated from the following description of the embodiments, taken in conjunction with the accompanying drawings of which:

FIG. 4 is a diagram for explaining that the electronic device according to an embodiment adjusts a voltage variation criterion for identifying separation of the connector depending on an operating intensity;

FIG. 7 is a diagram for explaining that the electronic device according to an embodiment determines whether the connector is separated depending on the number of times an interlock circuit is detected to be open;

DETAILED DESCRIPTION

Figure 1:
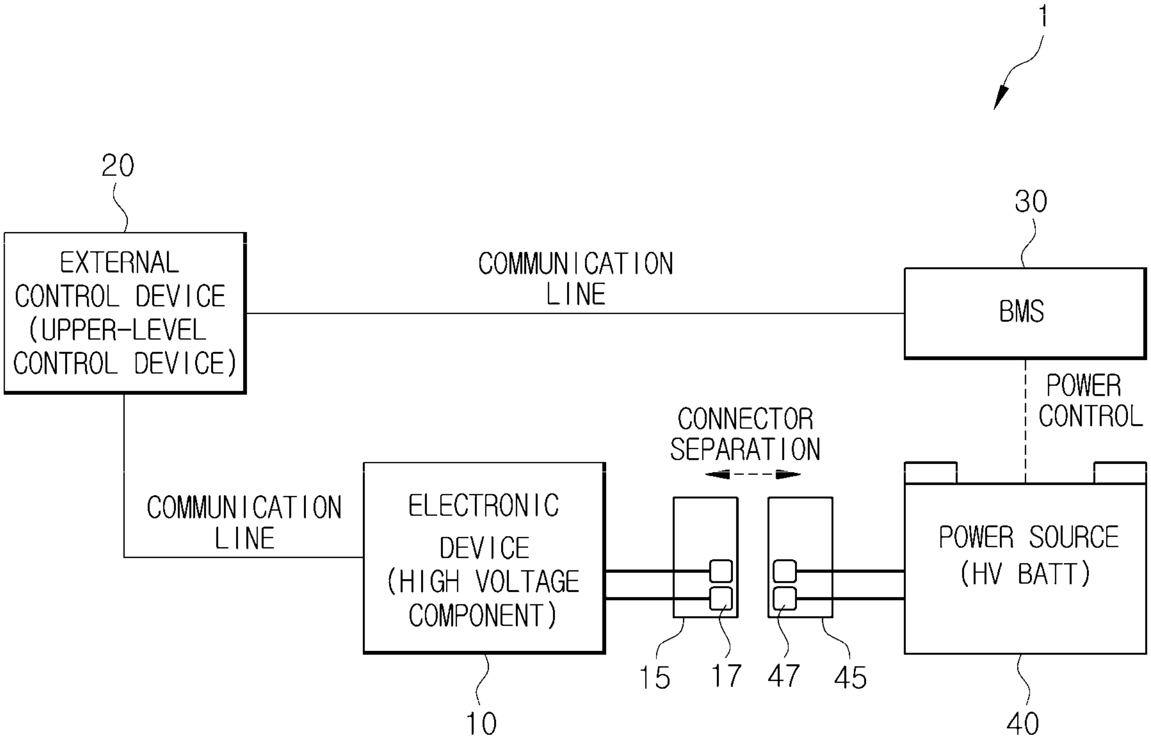
FIG. 1 illustrates an example of a system supplying voltage to an electronic device according to an embodiment.

Throughout the specification, like reference numerals refer to like elements. This specification does not describe all factors of embodiments, and duplicative contents between general contents or embodiments in the technical field of the disclosure will be omitted.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

The singular forms "a," "an," and "the" include plural referents unless the context cl early dictates otherwise.

In addition, terms such as "~unit", "~part," "~block," "~member," "~module," and the like may denote a unit for processing at least one function or operation. For example, the terms may refer to at least one hardware such as a field-programmable gate array (FPGA)/an application specific integrated circuit (ASIC), at least one software stored in a memory, or at least one process processed by a processor.

In each step, an identification numeral is used for convenience of explanation, the identification numeral does not describe the order of the steps, and each step may be performed differently from the order specified unless the context clearly states a particular order.

Hereinafter, an embodiment of an electronic device and a control method thereof according to an aspect will be described in detail with reference to the accompanying drawings.

FIG. 1 illustrates an example of a system supplying voltage to an electronic device according to an embodiment.

Referring to FIG. 1, a system 1 configured to supply voltage to an electronic device 10 according to an embodiment includes the electronic device 10, which is a component driven by a high voltage, a power source 40 corresponding to a high voltage battery, an external control device 20, which is an upper-level control device for controlling power cut-off of the power source 40 based on whether connectors 15 and 45 of the respective electronic device 10 and power source 40 are separated, and a battery management system (BMS) 30 configured to cut off the power of the power source 40 depending on control of the external control device 20.

The electronic device 10 may be, for example, a high voltage component used in a vehicle, and a compressor may be an example. When the electronic device 10 is a compressor, the external control device 20 corresponding to the upper-level control device may correspond to full automatic temperature control (FATC).

Each of the electronic device 10, the external control device 20, the BMS 30, and the power source 40 may be connected to a network to transmit and receive information. For example, each of the electronic device 10, the external control device 20, the BMS 30, and the power source 40 may be connected to a vehicle network to transmit and receive information, and the type of vehicle network is not limited as long as it is a known type.

In this case, the connector 15 of the electronic device 10 includes a pair of terminals 17, and the pair of terminals 17 of the connector 15 may receive voltage from the power source 40 by coming into contact with a pair of terminals 47 of the connector 45 of the power source 40. That is, the pair of terminals 17 may correspond to high voltage terminals receiving a high voltage from the power source 40.

The electronic device 10 may determine whether the connector 15 is separated from the power source 40 based on a voltage variation between the pair of terminals 17 of the connector 15, and may request the external control device 20 to cut off the power of the power source 40 when the connector 15 is separated from the power source 40.

The electronic device 10 may also perform self-discharge using a capacitor provided therein in addition to requesting the external control device 20 to cut off the power of the power source 40.

As such, the electronic device 10 may prevent a user from an electric shock that may occur when the connector 15 is removed even if an interlock circuit is not separately provided by performing an interlock function such as the power cut-off of the power source 40 and the self-discharge based on the voltage variation between the pair of terminals 17 of the connector 15.

Hereinafter, the determination of whether the connector 15 is separated from the power source 40 based on the voltage variation between the pair of terminals 17 of the connector 15 by the electronic device 10 will be described in detail.

Figure 2:
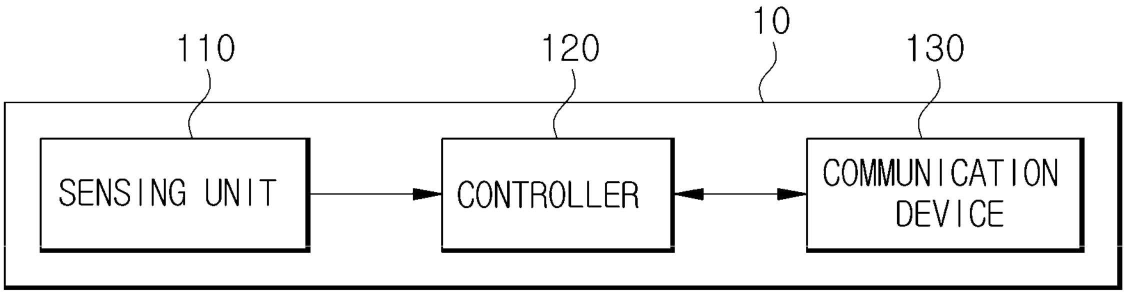
FIG. 2 is a control block diagram of the electronic device according to an embodiment.

FIG. 2 is a control block diagram of the electronic device 10 according to an embodiment.

Referring to FIG. 2, the electronic device 10 according to an embodiment includes a sensing unit 110 provided to detect a change in voltage or current inside the electronic device 10, a controller 120 configured to determine whether the connector 15 is separated from the power source 40 and control to perform the interlock function when the connector 15 is separated from the power source 40, and a communication device 130 provided to perform communication with the external control device 20 through a network.

The sensing unit 110 according to an embodiment may detect a change in voltage or current inside the electronic device 10. For example, the sensing unit 110 may include a voltage sensor to detect a voltage between the pair of terminals 17 of the connector 15.

In addition, according to an embodiment, when the electronic device 10 includes an interlock circuit connected to or shorted to an interlock circuit provided in the connector 45 of the power source 40 depending on whether the connector 15 is separated, the sensing unit 110 may include a sensor (e.g., a current sensor) for detecting whether the interlock circuit is open.

The controller 120 according to an embodiment may determine whether the connector 15 is separated from the power source 40 based on the voltage variation between the pair of terminals 17 of the connector 15.

Specifically, the controller 120 may determine that the connector 15 is separated from the power source 40 when a change value in voltage between the pair of terminals 17 for a preset time in an operation mode of the electronic device 10 is equal to or greater than a preset value.

In this case, according to the embodiment, the controller 120 may adjust the preset value to decrease as an operating intensity of the electronic device 10 increases.

Also, the controller 120 may determine that the connector 15 is separated from the power source 40 when a change rate of a voltage between the pair of terminals 17 per unit time in a standby mode of the electronic device 10 is maintained within a preset range.

In this case, the controller 120 may determine whether the change rate of the voltage between the pair of terminals 17 per unit time is maintained within the preset range by determining the change rate of the voltage between the pair of terminals 17 per unit time by a set number of times at a preset time interval.

Also, according to an embodiment, when the electronic device 10 includes an interlock circuit connected to or shorted to the interlock circuit provided in the connector 45 of the power source 40 depending on whether the connector 15 is separated, the controller 120 may determine at a preset time interval whether the interlock circuit is open, and when it is identified that the interlock circuit is open at a preset first number of times, the controller 120 may determine whether the connector 15 is separated from the power source 40 based on the opening of the interlock circuit and the voltage variation between the pair of terminals 17.

Also, according to an embodiment, when the electronic device 10 includes an interlock circuit, the controller 120 may determine that the connector 15 is separated from the power source 40 when it is determined that the interlock circuit is open by a second number of times greater than the first number of times.

The controller 120 according to an embodiment may control the communication device 130 to request the external control device 20 to cut off the power of the power source 40 when the connector 15 is separated from the power source 40 and perform self-discharge.

The controller 120 may include at least one memory in which a program for performing the above-described operations and operations to be described later is stored, and at least one processor for executing the stored program. In a case where a plurality of the memories and processors is provided, they may be integrated on one chip or may be physically disposed in separate locations.

The communication device 130 according to an embodiment may transmit/receive data with the external control device 20 through a network (e.g., the vehicle network). To this end, the communication device 130 may be provided as a communication module of a known type.

The control configuration of the electronic device 10 has been described above. Hereinafter, a description of how the electronic device 10 determines that the connector 15 is separated from the power source 40 using the control configuration will be given in more detail.

Figure 3:
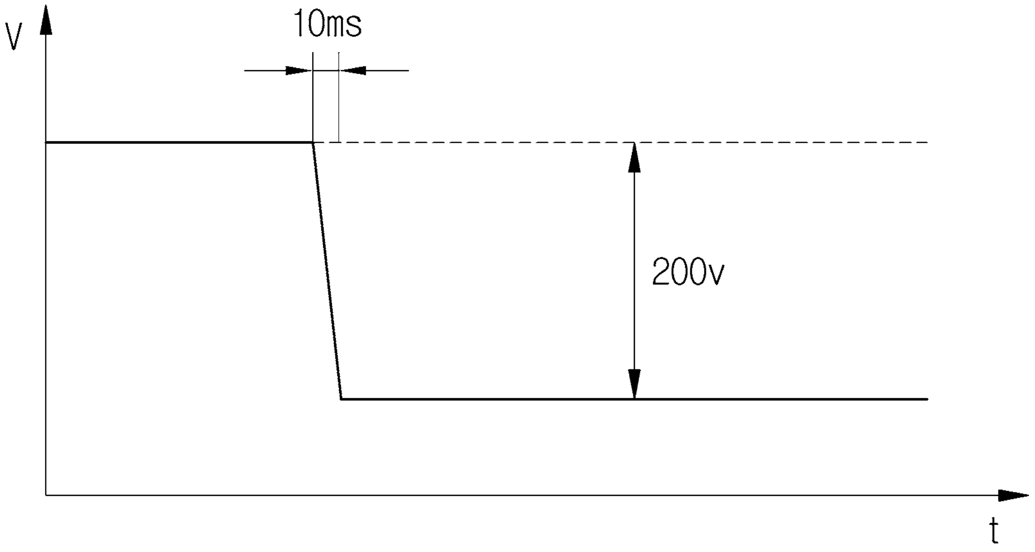
FIG. 3 is a diagram for explaining that the electronic device according to an embodiment identifies whether a connector is separated in an operation mode.

FIG. 3 is a diagram for explaining that the electronic device 10 according to an embodiment identifies whether the connector 15 is separated in the operation mode, and FIG. 4 is a diagram for explaining that the electronic device 10 according to an embodiment adjusts a voltage variation criterion for identifying separation of the connector 10 depending on an operating intensity.

Referring to FIG. 3, when the change value in voltage between the pair of terminals 17 for the preset time in the operation mode of the electronic device 10 is equal to or greater than the preset value, the electronic device 10 according to an embodiment may determine that the connector 15 is separated from the power source 40.

That is, when the power source 40 is cut off as the connector 15 is separated while voltage is being supplied to a load of the electronic device 10 in the operation mode, a surge voltage is generated, so that the change value in voltage between the pair of terminals 17 for the preset time may increase.

For example, as illustrated in FIG. 3, the electronic device 10 may determine that the connector 15 is separated from the power source 40 when the voltage between the pair of terminals 17 changes by 200 V or more for 10 ms.

In this case, according to an embodiment, the electronic device 10 may adjust such that the preset value decreases as the operating intensity of the electronic device 10 increases.

For example, when the electronic device 10 is a compressor, as illustrated in FIG. 4, the electronic device 10 may adjust such that an absolute value criterion of the voltage variation, that is, the preset value decreases as an operating RPM increases.

Figure 5:
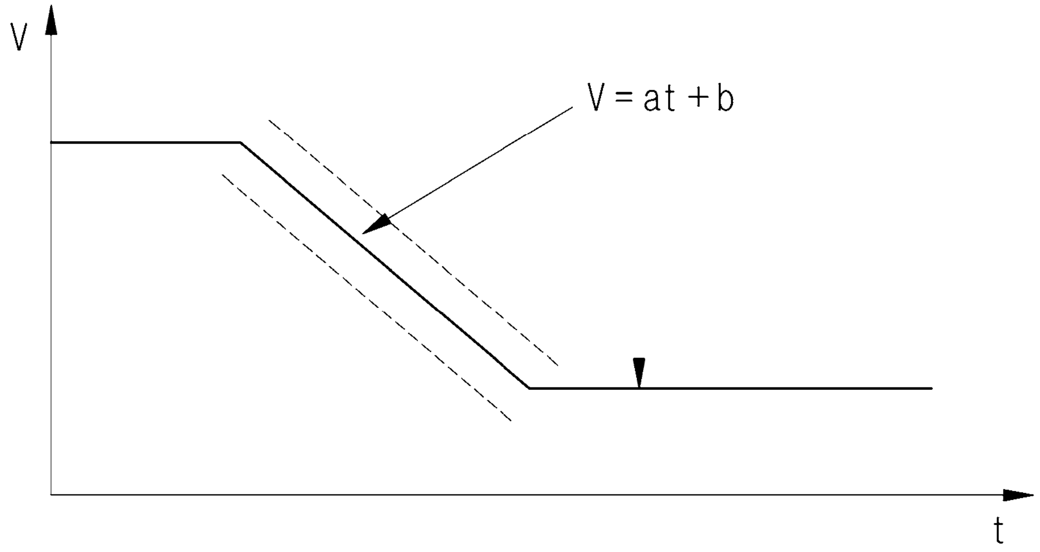
FIG. 5 is a diagram for explaining that the electronic device according to an embodiment identifies whether the connector is separated in a standby mode.

FIG. 5 is a diagram for explaining that the electronic device 10 according to an embodiment identifies whether the connector 15 is separated in the standby mode.

Referring to FIG. 5, the electronic device 10 according to an embodiment may determine that the connector 15 is separated from the power source 40 when the change rate of the voltage between the pair of terminals 17 per unit time in the standby mode of the electronic device 10 is maintained within the preset range.

In this case, the electronic device 10 may determine whether the change rate of the voltage between the pair of terminals 17 per unit time is maintained within the preset range by determining the change rate of the voltage between the pair of terminals 17 per unit time by the set number of times at the preset time interval.

For example, the electronic device 10 may determine that the connector 15 is separated from the power source 40 when the change rate of the voltage between the pair of terminals 17 per unit time determined for 2 to 3 times for 5 ms is maintained within the preset range, respectively.

That is, considering that the voltage decreases at a constant change rate over time due to self-discharge in the standby mode, the electronic device 10 may determine that the connector 15 is separated from the power source 40 and self-discharge occurs when the change rate of the voltage between the pair of terminals 17 per unit time is maintained within the preset range, thereby determining that the connector 15 is separated from the power source 40.

Figure 6:
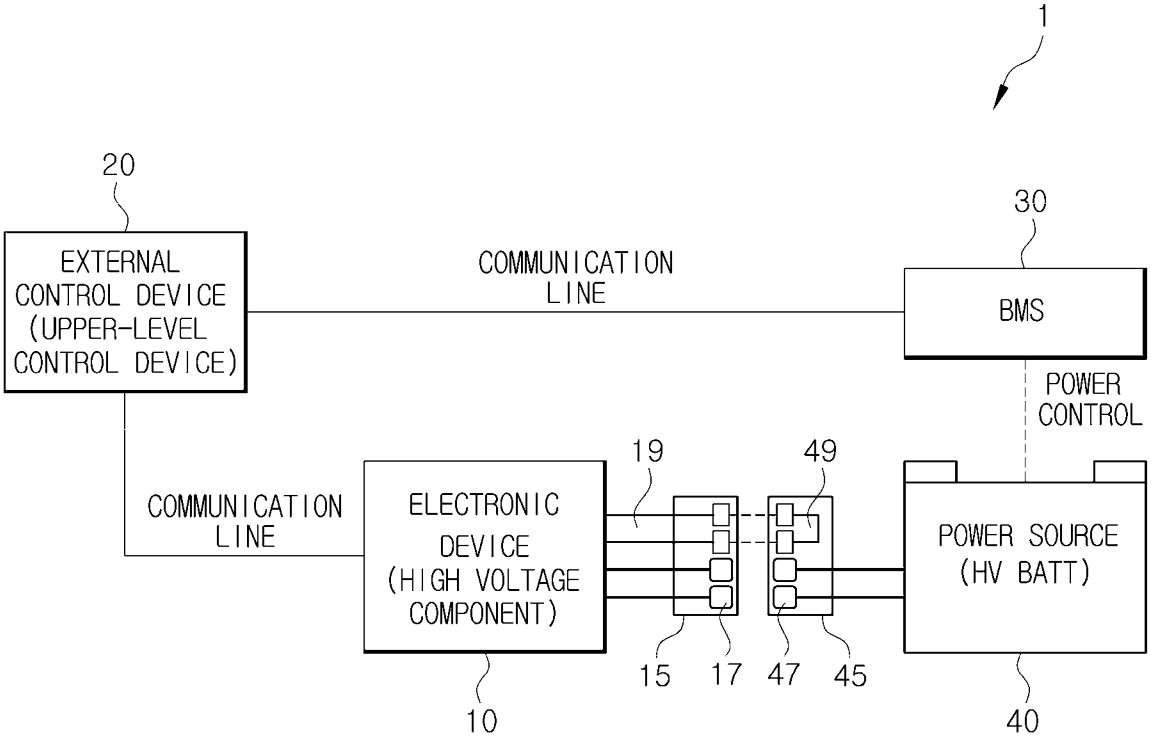
FIG. 6 illustrates another example of the system supplying voltage to the electronic device according to an embodiment.

FIG. 6 illustrates another example of the system supplying voltage to the electronic device 10 according to an embodiment, and FIG. 7 is a diagram for explaining that the electronic device according to an embodiment determines whether the connector is separated depending on the number of times an interlock circuit is detected to be open.

Referring to FIG. 6, unlike the description in FIG. 1, the electronic device 10 according to an embodiment may further include an interlock circuit 19 that is open when the connector 15 is separated from the power source 40.

The interlock circuit 19 may form a closed circuit by being connected to an interlock circuit 49 of the power source 40 when the connector 15 is connected to the power source 40 and form an open circuit when the connector 15 is separated from power source 40.

That is, the interlock circuit 19 may be open when the connector 15 is separated from the power source 40.

In this case, the interlock circuit 19 may include a pull-up resistor and a grounding part for determining whether it is open.

The electronic device 10 according to an embodiment may determine at the preset time interval whether the interlock circuit 19 is open.

Also, as illustrated in FIG. 7, when it is identified that the interlock circuit 19 is open by the preset first number of times (e.g., two times), the electronic device 10 may determine whether the connector 15 is separated from the power source 40 based on the opening of the interlock circuit 19 and the voltage variation between the pair of terminals 17.

Also, as illustrated in FIG. 7, when it is identified that the interlock circuit 19 is open by the second number of times (e.g., five times) greater than the first number of times, the electronic device 10 may determine that the connector 15 is separated from the power source 40.

As such, instead of directly connecting the interlock circuit to the MCU of the external control device 20, the electronic device 10 provides an interlock circuit only between the electronic device 10 and the power source 40, so that cost may be reduced, and the separation of the connector 15 may be determined by considering both the interlock circuit and the voltage variation, thereby increasing the accuracy of detection of the separation of the connector 15 while optimizing the circuit architecture.

Figure 8:
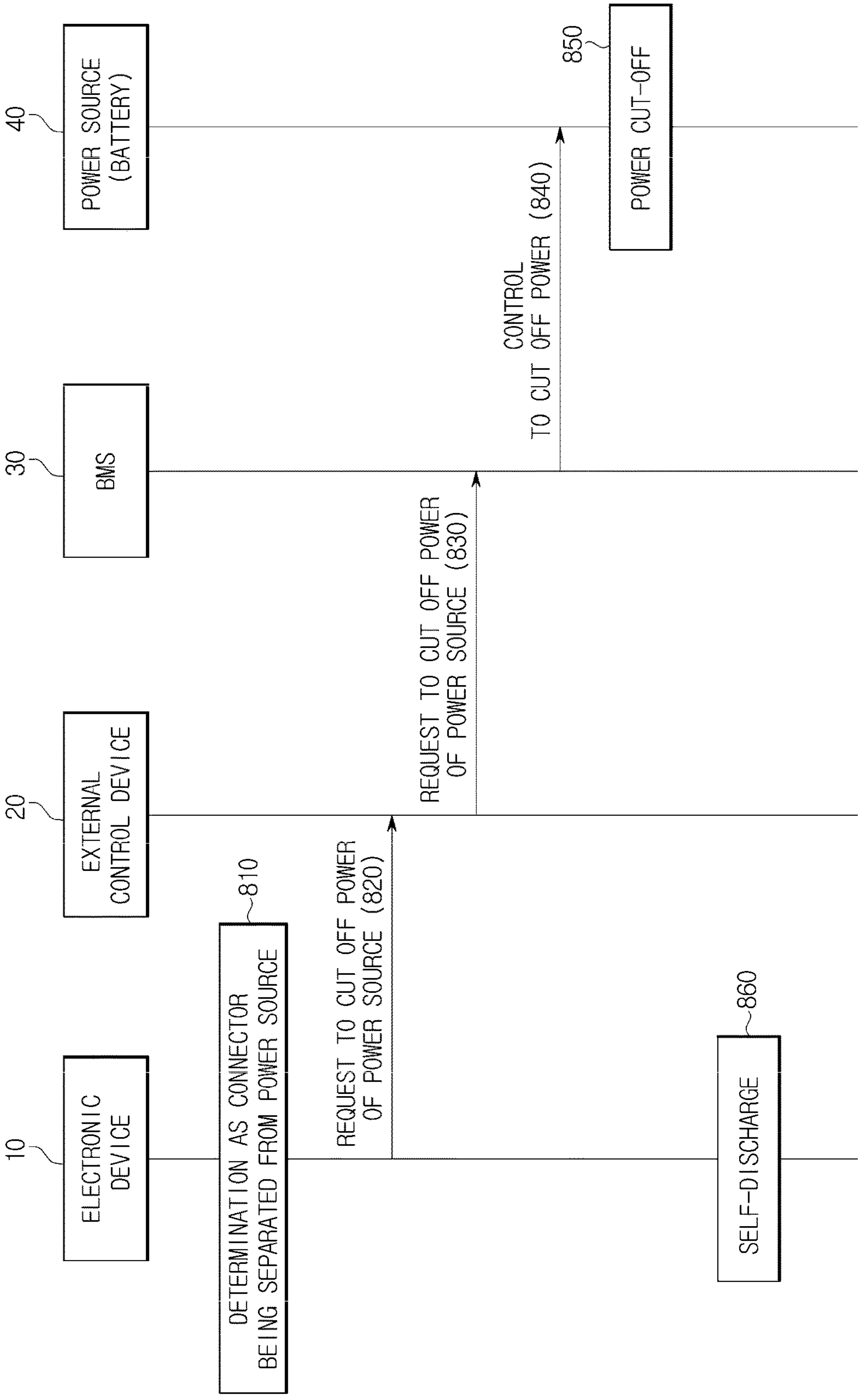
FIG. 8 is a signal flow diagram when the electronic device according to an embodiment determines that the connector is separated.

FIG. 8 is a signal flow diagram when the electronic device 10 according to an embodiment determines that the connector 15 is separated.

Referring to FIG. 8, the electronic device 10 according to an embodiment may determine that the connector 15 is separated from the power source 40 (810), and in this case, may request the external control device 20 to cut off the power of the power source 40 (820).

In this case, the external control device 20 may request the BMS 30 to cut off the power of the power source 40 (830), and the BMS 30 may control the power source 40 to cut off the power (840).

The power source 40 may cut off the power under the control of the BMS 30 (850), thereby preventing power supply to the electronic device 10.

Also, when it is determined that the connector 15 is separated from the power source 40 (810), the electronic device 10 may perform self-discharge (860). That is, in addition to requesting the external control device 20 to cut off the power of the power source 40, the electronic device 10 may perform self-discharge using a capacitor provided therein.

As such, by performing the interlock function such as the power cut-off of the power source 40 and self-discharge based on the voltage variation between the pair of terminals 17 of the connector 15, the electronic device 10 may prevent a user from an electric shock that may occur when the connector 15 is removed.

However, according to an embodiment, unlike illustrated in FIG. 8, when it is determined that the connector 15 is separated from the power source 40, the electronic device 10 immediately performs self-discharge and may also request the external control device 20 to cut off the power of the power source 40 after starting control to perform self-discharge.

Specifically, the controller 120 may control to perform self-discharge in response to the opening of the interlock circuit 19 and the identification of the voltage variation between the pair of terminals 17, and may control the communication device 130 to request the external control device 20 to cut off the power of the power source 40 after controlling to be perform self-discharge.

That is, when the electronic device 10 determines that the connector 15 is separated from the power supply 40 in the case of including the interlock circuit 19, the electronic device 10 may request the external control device 20 to cut off the power of the power source 40 after starting control to perform self-discharge.

Through this, the electronic device 10 may enhance a protection function by reducing a discharge time and reduce a risk of burnout of the electronic device 10.

For example, the electronic device 10 may identify that the interlock circuit 19 is open by the preset first number of times (e.g., two times), may control to perform self-discharge in response to the opening of the interlock circuit 19 and identification of the voltage variation between the pair of terminals 17 when it is determined that the connector 15 is separated from the power supply 40 based on the opening of the interlock circuit 19 and the voltage variation between the pair of terminals 17, and may control the communication device 130 to request the external control device 20 to cut off the power of the power source 40 after controlling to be perform self-discharge. Through this, the electronic device 10 may reduce the possibility of self-discharge failure due to an error and reduce the self-discharge time.

Conversely, when the electronic device 10 determines that the connector 15 is separated from the power source 40 by identifying that the interlock circuit 19 is open by the second number of times (e.g., five times) greater than the first number of times, as illustrated in FIG. 8, the electronic device 10 may perform self-discharge after completion of cooperative control for protecting a main relay by performing self-discharge after controlling the communication device 130 to request the external control device 20 to cut off the power of the power source 40.

Hereinafter, an embodiment of a control method of the electronic device 10 according to an aspect will be described. The electronic device 10 according to the above-described embodiment may be used for the control method of the electronic device 10. Therefore, the contents described above with reference to FIGS. 1 to 8 may be equally applied to the control method of the electronic device 10.

Figure 9:
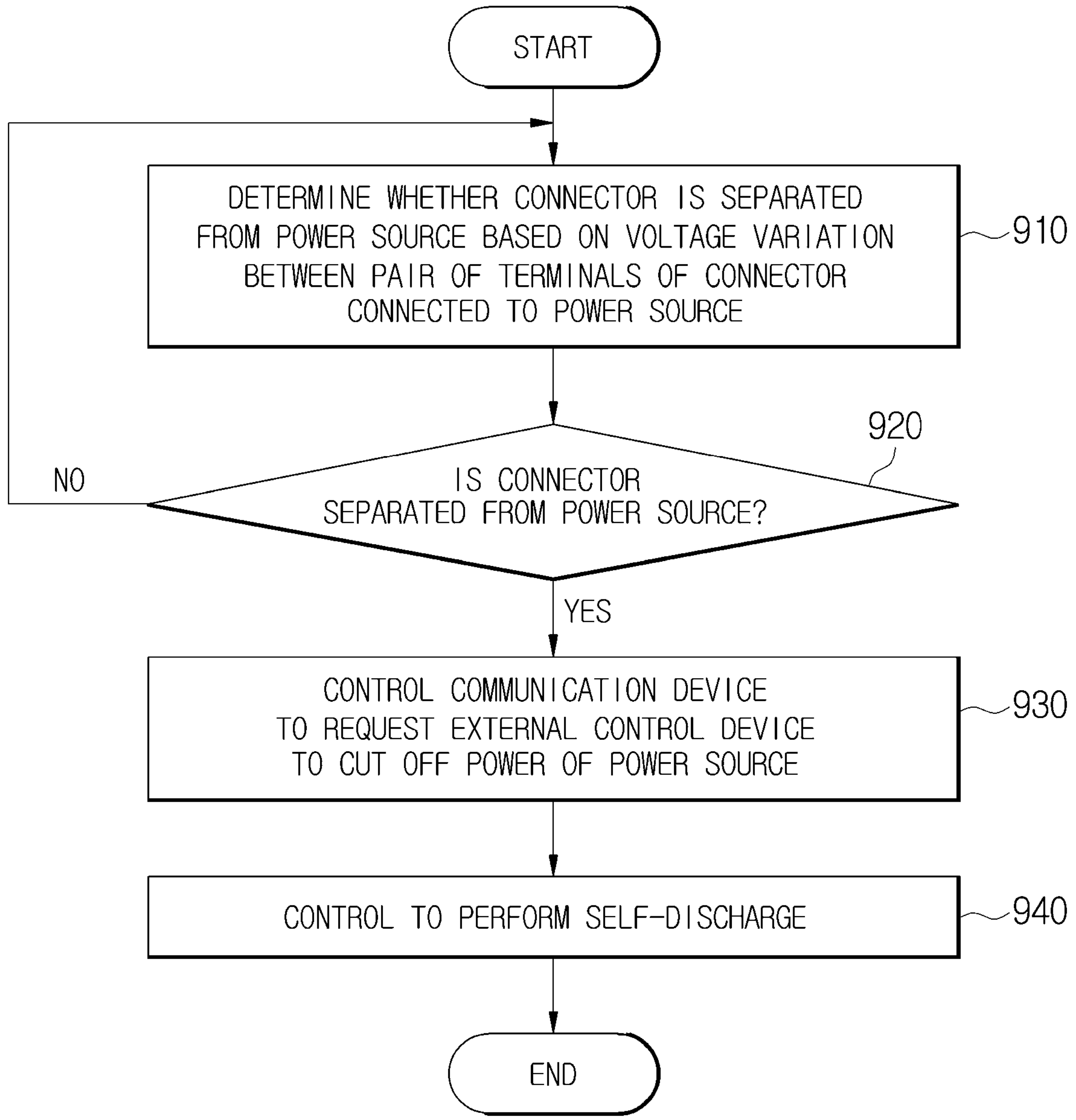
FIG. 9 is a flowchart illustrating identification and operation of separation of the connector from a power source in a control method of the electronic device according to an embodiment.

FIG. 9 is a flowchart illustrating identification and operation of separation of the connector 15 from the power source 40 in a control method of the electronic device 10 according to an embodiment.

Referring to FIG. 9, the electronic device 10 according to an embodiment may determine whether the connector 15 is separated from the power source 40 based on the voltage variation between the pair of terminals 17 of the connector 15 connected to the power source 40 (910).

In this case, when the connector 15 is separated from the power source 40 (YES in 920), the electronic device 10 may control the communication device 130 to request the external control device 20 to cut off the power of the power source 40 (930), and may control to perform self-discharge (940).

Figure 10:
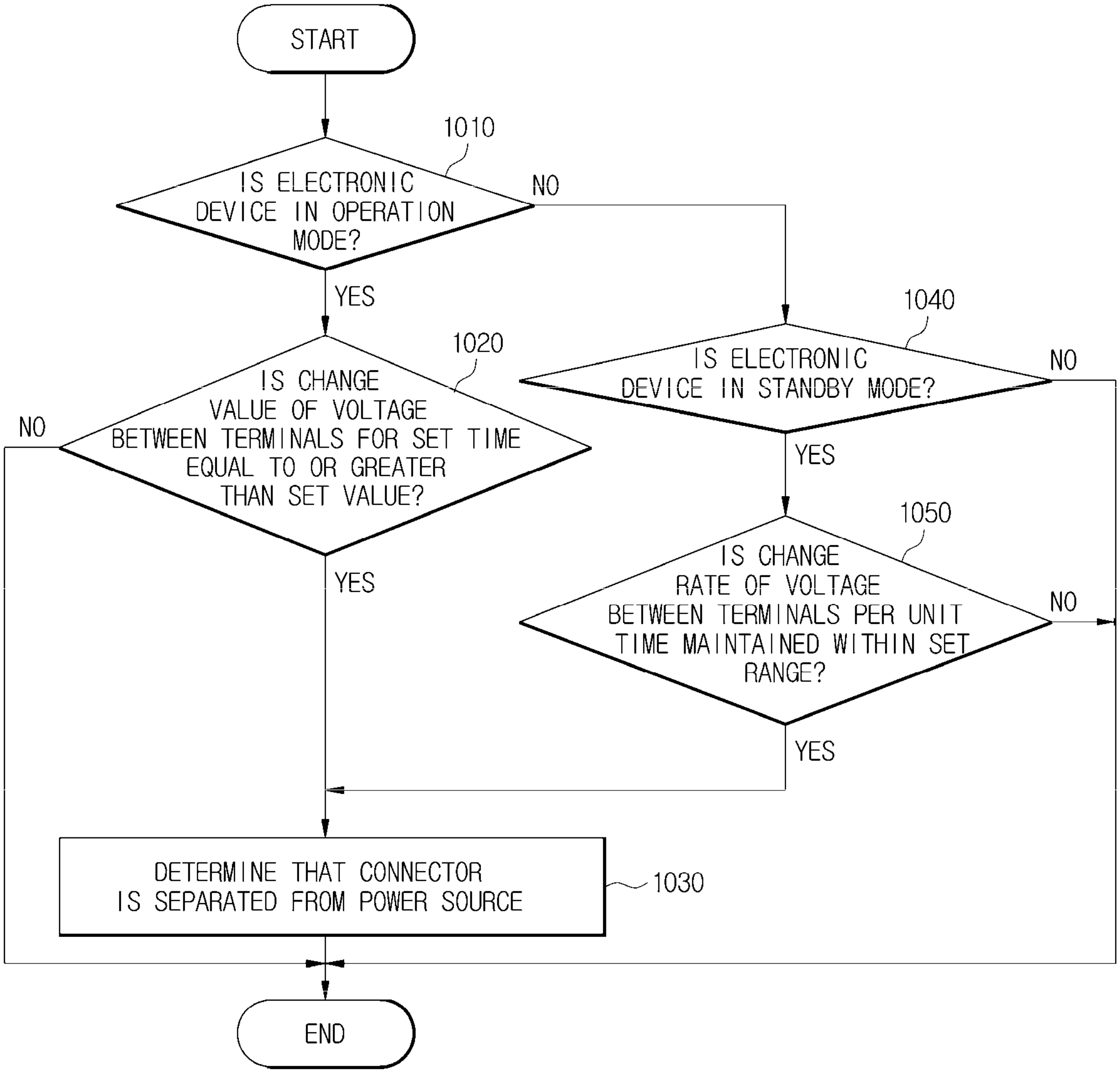
FIG. 10 is a flowchart illustrating identification of separation of the connector from the power source based on a voltage variation at a terminal of the connector in the control method of the electronic device according to an embodiment.

FIG. 10 is a flowchart illustrating identification of separation of the connector 15 from the power source 40 based on voltage variations at the terminal of the connector 10 in the control method of the electronic device 10 according to an embodiment.

Referring to FIG. 10, when the change value of the voltage between the terminals 17 for the set time is equal to or greater than the set value (YES in 1020) in a situation where the electronic device 10 is in the operation mode (YES in 1010), the electronic device 10 according to an embodiment may determine that the connector 15 is separated from the power source 40 (1030).

In addition, when the change rate of the voltage between the terminals 17 per unit time is maintained within the set range (YES in 1050) in a situation where the electronic device 10 is in the standby mode (YES in 1040), the electronic device 10 according to an embodiment may determine that the connector 15 is separated from the power source 40 (1030).

Figure 11:
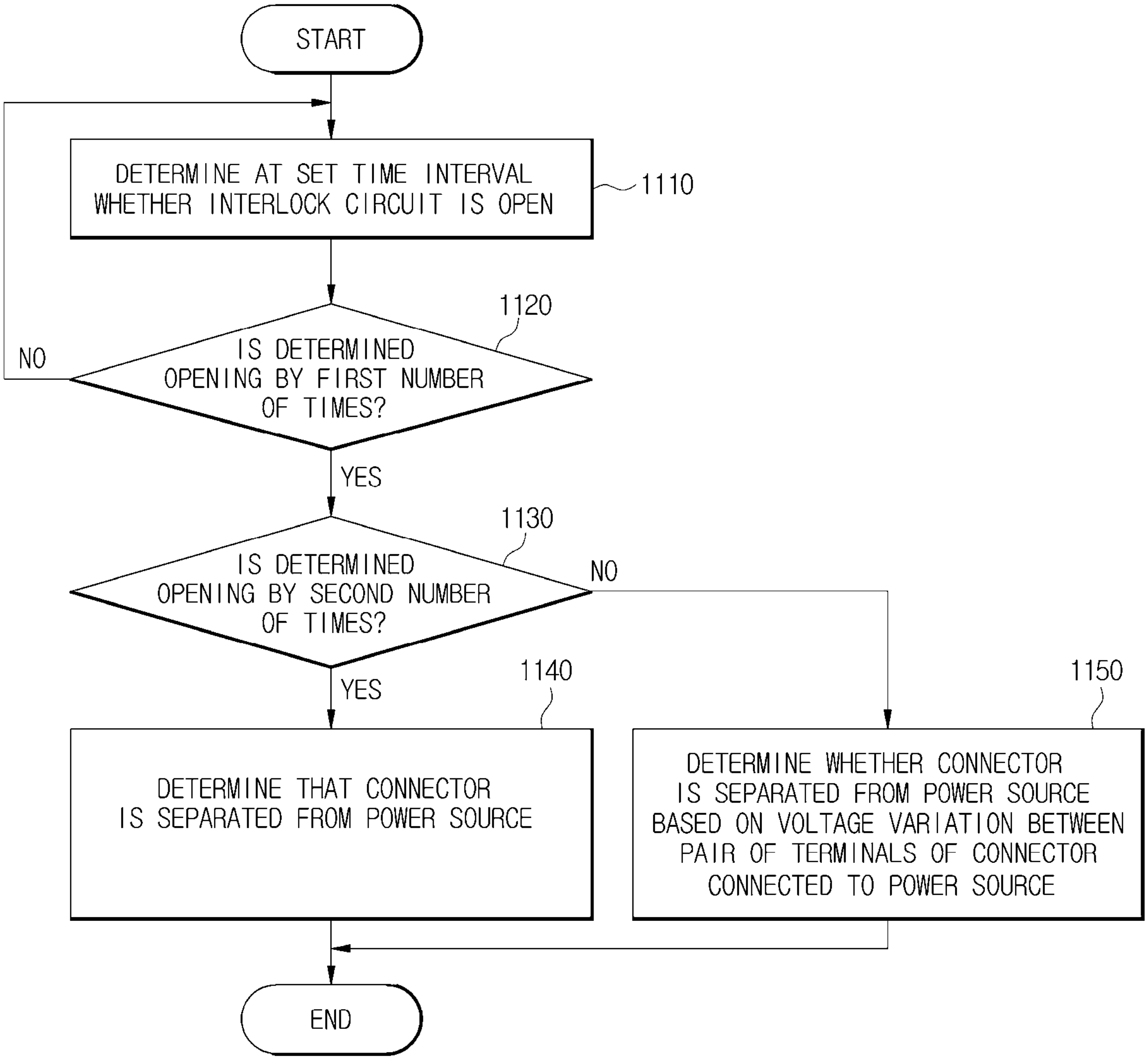
FIG. 11 is a flowchart illustrating identification of separation of the connector from the power source when an interlock circuit is provided in the control method of the electronic device according to an embodiment.

FIG. 11 is a flowchart illustrating identification of separation of the connector 15 from the power source 40 when the interlock circuit 19 is provided in the control method of the electronic device 10 according to an embodiment.

Referring to FIG. 11, the electronic device 10 according to an embodiment may determine at the set time interval whether the interlock circuit 19 is open (1110).

In this case, when the opening is determined by the first number of times (YES in 1120) and the opening is determined by the second number of times (YES in 1130), the electronic device 10 may determine that the connector 15 is separated from the power source 40 (1140).

In addition, when the opening is determined by the first number of times (YES in 1120), but the opening is not determined by the second number of times (No in 1130), the electronic device 10 may determine whether the connector 15 is separated from the power source 40 based on the voltage variation between the pair of terminals 17 of the connector 15 connected to the power source 40 (1150).

As is apparent from the above, an electronic device and a control method thereof according to an aspect can increase the accuracy of detecting separation of a connector while optimizing a circuit architecture by determining whether the connector is separated from a power source based on a voltage variation between connector terminals even if an interlock circuit is minimized or removed.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

The invention claimed is:

1. An electronic device comprising:

a connector comprising a pair of terminals connected to a power source;

a voltage sensor configured to detect a voltage between the pair of terminals;

a communication device configured to communicate with an external control device through a network;

a first interlock circuit configured to form a closed circuit by being connected to a second interlock circuit of the power source when the connector is connected to the power source, and to form an open circuit when the connector is separated from the power source; and a controller configured to determine whether the connector is separated from the power source based on a voltage variation between the pair of terminals, to control the communication device to request the external control device to cut off power of the power source when the connector is separated from the power source, and to perform self-discharge.

2. The electronic device according to claim 1, wherein the controller determines that the connector is separated from the power source when a change value of the voltage between the pair of terminals for a preset time in an operation mode of the electronic device is equal to or greater than a preset value.

3. The electronic device according to claim 2, wherein the controller adjusts such that the preset value decreases as an operating intensity of the electronic device increases.

4. The electronic device according to claim 1, wherein the controller determines that the connector is separated from the power source when a change rate of the voltage between the pair of terminals per unit time in a standby mode of the electronic device is maintained within a preset range.

5. The electronic device according to claim 4, wherein the controller determines whether the change rate of the voltage between the pair of terminals per unit time is maintained within the preset range by determining the change rate of the voltage between the pair of terminals per unit time by a set number of times at a preset time interval.

6. The electronic device according to claim 1, wherein the controller determines whether the first interlock circuit is open at a preset time interval.

7. The electronic device according to claim 6, wherein the controller determines whether the connector is separated from the power source based on the opening of the first interlock circuit and the voltage variation between the pair of terminals when identifying that the first interlock circuit is open at a preset first number of times.

8. The electronic device according to claim 7, wherein the controller determines that the connector is separated from the power source when identifying that the first interlock circuit is open at a preset second number of times.

9. The electronic device according to claim 8, wherein the preset second number of times is greater than the preset first number of times.

10. The electronic device according to claim 6, wherein the controller performs self-discharge in response to the opening of the first interlock circuit and identification of the voltage variation between the pair of terminals, and controls the communication device to request the external control device to cut off the power of the power source after controlling to perform self-discharge.

11. A control method of an electronic device which comprises a connector comprising a pair of terminals connected to a power source, a voltage sensor provided to detect a voltage between the pair of terminals, and a communication device provided to perform communication with an external control device through a network, and a first interlock circuit configured to form a closed circuit by being connected to a second interlock circuit of the power source when the connector is connected to the power source, and to form an open circuit when the connector is separated from the power source, the control method comprising:

determining, by a controller, whether the connector is separated from the power source based on a voltage variation between the pair of terminals;

controlling the communication device to request the external control device to cut off power of the power source when the connector is separated from the power source; and performing self-discharge.

12. The control method according to claim 11, wherein determining whether the connector is separated from the power source based on the voltage variation between the pair of terminals comprises determining that the connector is separated from the power source when a change value of the voltage between the pair of terminals for a preset time in an operation mode of the electronic device is equal to or greater than a preset value.

13. The control method according to claim 12, wherein determining whether the connector is separated from the power source based on the voltage variation between the pair of terminals comprises adjusting such that the preset value decreases as an operating intensity of the electronic device increases.

14. The control method according to claim 11, wherein determining whether the connector is separated from the power source based on the voltage variation between the pair of terminals comprises determining that the connector is separated from the power source when a change rate of the voltage between the pair of terminals per unit time in a standby mode of the electronic device is maintained within a preset range.

15. The control method according to claim 14, wherein determining whether the connector is separated from the power source based on the voltage variation between the pair of terminals comprises determining whether the change rate of the voltage between the pair of terminals per unit time is maintained within the preset range by determining the change rate of the voltage between the pair of terminals per unit time by a set number of times at a preset time interval.

16. The control method according to claim 11, further comprising determining at a preset time interval whether the first interlock circuit is open.

17. The control method according to claim 16, wherein determining whether the connector is separated from the power source based on the voltage variation between the pair of terminals comprises determining whether the connector is separated from the power source based on the opening of the first interlock circuit and the voltage variation between the pair of terminals when identifying that the first interlock circuit is open at a preset first number of times.

18. The control method according to claim 17, further comprising determining that the connector is separated from the power source when identifying that the first interlock circuit is open at a preset second number of times.

19. The control method according to claim 18, wherein the preset second number of times is greater than the preset first number of times.

20. The control method according to claim 17, further comprising:

performing self-discharge in response to the opening of the first interlock circuit and identification of the voltage variation between the pair of terminals; and controlling the communication device to request the external control device to cut off the power of the power source after controlling to perform self-discharge.

* * * * *